United States Patent
Roth et al.

(10) Patent No.: US 11,621,954 B2
(45) Date of Patent: *Apr. 4, 2023

(54) TOKEN BASED ONE-TIME PASSWORD SECURITY

(71) Applicant: Amazon Technologies, Inc., Reno, NV (US)

(72) Inventors: Gregory Branchek Roth, Seattle, WA (US); Graeme David Baer, Seattle, WA (US); Brian Irl Pratt, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 58 days.

This patent is subject to a terminal disclaimer.

(21) Appl. No.: 16/921,172

(22) Filed: Jul. 6, 2020

(65) Prior Publication Data

US 2020/0336479 A1 Oct. 22, 2020

Related U.S. Application Data

(63) Continuation of application No. 15/958,655, filed on Apr. 20, 2018, now Pat. No. 10,771,456, which is a continuation of application No. 14/976,398, filed on Dec. 21, 2015, now Pat. No. 9,954,856, which is a continuation of application No. 13/671,304, filed on Nov. 7, 2012, now Pat. No. 9,218,476.

(51) Int. Cl.
*H04L 9/40* (2022.01)
*G06F 21/34* (2013.01)

(52) U.S. Cl.
CPC .......... *H04L 63/0838* (2013.01); *G06F 21/34* (2013.01)

(58) Field of Classification Search
CPC ............................ H04L 63/0838; G06F 21/34
See application file for complete search history.

(56) References Cited

U.S. PATENT DOCUMENTS

| | | | |
|---|---|---|---|
| 6,078,888 A | 6/2000 | Johnson, Jr. | |
| 7,805,127 B2 | 9/2010 | Andreasen et al. | |
| 7,921,455 B2 | 4/2011 | Lin et al. | |
| 8,312,519 B1 | 11/2012 | Bailey et al. | |
| 2006/0083228 A1* | 4/2006 | Ong | H04L 63/0823 370/389 |
| 2006/0256961 A1* | 11/2006 | Brainard | G06F 21/31 380/44 |

(Continued)

OTHER PUBLICATIONS

U.S. Non-Final Office Action issued in U.S. Appl. No. 13/671,304 dated Oct. 8, 2014.

(Continued)

*Primary Examiner* — Meng Li
(74) *Attorney, Agent, or Firm* — Hogan Lovells US LLP

(57) ABSTRACT

A one-time password (OTP) based security scheme is described, where a provider pre-generates a number of verification codes (e.g., OTP codes) which will be valid for a predetermined interval. The provider then encodes the verification codes (e.g., by hashing each code with a time value), and stores the verification codes into a data structure. The data structure can be provided to a verification system that can use the set of pre-generated OTP codes to authenticate requests received from users having personal security tokens.

20 Claims, 6 Drawing Sheets

(56) References Cited

U.S. PATENT DOCUMENTS

| | | | |
|---|---|---|---|
| 2009/0182726 A1* | 7/2009 | Wang | G06F 16/90335 707/999.005 |
| 2009/0316903 A1* | 12/2009 | Jeung | H04L 63/0838 380/271 |
| 2010/0017330 A1* | 1/2010 | Tan | G06Q 10/06 705/50 |
| 2010/0319058 A1 | 12/2010 | Chen | |
| 2012/0155646 A1 | 6/2012 | Seshadri et al. | |
| 2012/0233675 A1* | 9/2012 | Hird | H04L 63/0838 726/6 |

OTHER PUBLICATIONS

U.S. Non-Final Office Action issued in U.S. Appl. No. 13/671,304 dated Feb. 24, 2015.
U.S. Notice of Allowance issued in U.S. Appl. No. 13/671,304 dated Aug. 31, 2015.
U.S. Non-Final Office Action issued in U.S. Appl. No. 14/976,398 dated May 4, 2017.
U.S. Notice of Allowance issued in U.S. Appl. No. 14/976,398 dated Nov. 14, 2017.
U.S. Non-Final Office Action issued in U.S. Appl. No. 15/958,655 dated Oct. 30, 2018.
U.S. Final Office Action issued in U.S. Appl. No. 15/958,655 dated Apr. 1, 2019.
U.S. Non-Final Office Action issued in U.S. Appl. No. 15/958,655 dated Nov. 27, 2019.
U.S. Final Office Action issued in U.S. Appl. No. 15/958,655 dated Mar. 9, 2020.
U.S. Notice of Allowance issued in U.S. Appl. No. 15/958,655 dated May 13, 2020.

\* cited by examiner

TOKEN BASED ONE-TIME PASSWORD SECURITY

CROSS REFERENCE TO RELATED APPLICATIONS

This application is a Continuation of allowed U.S. patent application Ser. No. 15/958,655, filed with the U.S. Patent and Trademark Office Apr. 20, 2018, which is a continuation of allowed U.S. patent application Ser. No. 14/976,398, filed with the U.S. Patent and Trademark Office on Dec. 21, 2015 now U.S. Pat. No. 9,954,856, which is a continuation of allowed U.S. patent application Ser. No. 13/671,304, filed with the U.S. Patent and Trademark Office on Nov. 7, 2012, now U.S. Pat. No. 9,218,476; both entitled "Token Based One-Time Password Security," which are incorporated herein by reference for all purposes.

BACKGROUND

Given the ever increasing use of computing devices, security remains an important consideration in controlling access to various systems. The objectives of security in the computer context include the protection of sensitive and valuable information from publication, tampering or destruction by unauthorized activities and untrustworthy individuals. For example, a bank typically has highly sensitive financial information about its customers and a considerable amount of effort goes into securing such bank records and other financial data.

One-time password (OTP) is one form of security scheme in which a password (e.g., OTP code) is used, which is valid for only one login session or transaction. In conventional OTP implementations, a user is provided with a personal token that can be used to generate a one-time password for the user. The user can use this password to log into a secured system, such as a web portal with access to their financial information. OTP based systems can overcome many shortcomings of traditional password based systems; however, conventional OTP systems have a number of limitations.

BRIEF DESCRIPTION OF THE DRAWINGS

Various embodiments in accordance with the present disclosure will be described with reference to the drawings, in which.

DETAILED DESCRIPTION

Figure 1:
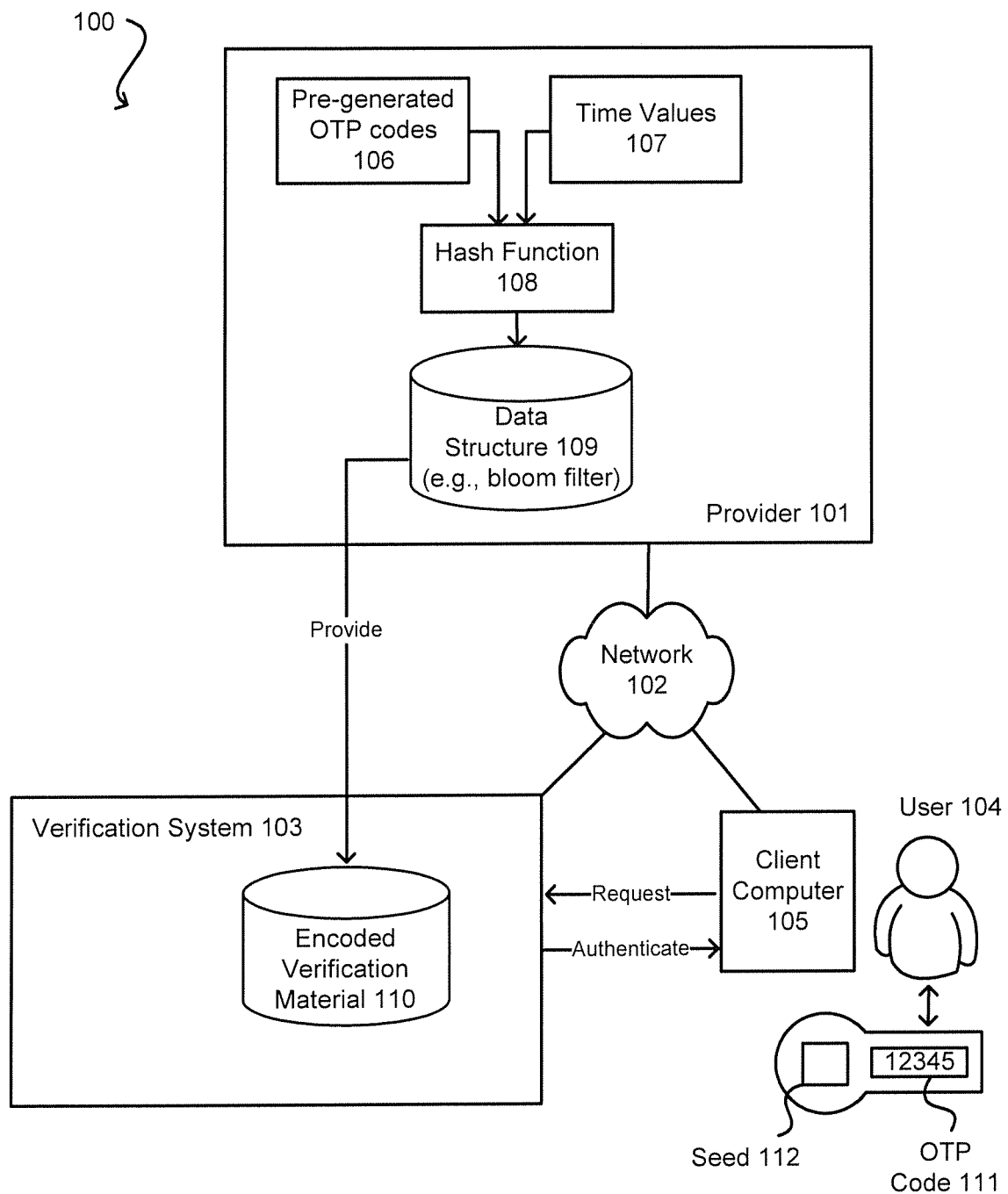
FIG. 1 illustrates an example of a set of pre-generated OTP codes being used by a verification system to authenticate user access requests, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for securing access to computer systems. In particular, various embodiments utilize a one-time password (OTP) based security scheme, where a provider pre-generates a number of verification codes (e.g., OTP codes) which will be valid for a predetermined time interval (or a predetermined number of event-based counter values), encodes the verification codes (e.g., by hashing each code with a time value), and stores the verification codes into a data structure. The data structure can be provided to a verification system that can use the set of pre-generated codes to authenticate requests received from users having personal security tokens. Once the time interval is nearing expiration, the provider can generate a renewal set of verification codes and provide the renewal codes to the verification system for the upcoming time interval (or upcoming number of event-based counter values). This process can continue as needed or until the provider and/or the verification system decide to discontinue the service.

In conventional OTP based schemes, the hardware OTP devices (e.g., personal security tokens) typically contain immutable embedded seed material. The seed material is also communicated from the provider to the verification system. Subsequently, the seed value can be used to generate codes which can in turn be used to authenticate requests between the user and the verification system. Typically, the user's security token uses the embedded seed to calculate an OTP code for the user. The OTP code is based at least in part on the seed value embedded in the device. The OTP code may also be based on at least one of: (1) the current time or (2) a counter value (e.g., based on the number of times a user has pushed the button of the OTP device). The user then enters the OTP code as part of an access request to the verification system and the verification system uses its own seed material to determine whether the code entered by the user matches the code that would be displayed on the authentic token issued to the user. If the codes match, the request can be authenticated.

There are a number of limitations to such conventional OTP implementations. By way of example, the verification system becomes an attractive target for theft of the seed material. Such theft of the seed material from the verification system would break security and necessitate replacement of all OTP tokens that had been issued for the verification system. In addition, this type of scheme usually means that a given OTP device (i.e. security token) cannot be resold or reused by other verification systems. As a result, the devices can be quite expensive for the customer.

In various embodiments described herein, rather than communicating the seed material to the verification system at the time of token acquisition, the provider instead pre-generates a set of verification material (e.g., valid OTP codes) for a predefined interval (e.g., a week, a year, a number of event-based counter values actuated by button pushes, etc.), wherein each of the OTP codes is valid for a small portion (e.g., 30 seconds, one counter value, etc.) of the entire predefined interval. The set of verification material will typically take the form of a plurality of entries that is comprised of constraint and value pairs. For example, in time-based OTP systems, each entry in the verification material may be comprised of a timestamp and an OTP code that is valid during a time period associated with that timestamp. Similarly, in event-based OTP systems, each entry may be comprised of an event-based counter value and an OTP code that is associated with that counter value.

In accordance with an embodiment, once the set of verification material is generated, it can be secured (e.g., encoded) and stored efficiently. As an example, a bloom filter data structure can be used to efficiently store the set of valid OTP codes. Furthermore, by creating additional computational expense, it can be made expensive to search the space of OTP values. For example, the timestamp-key pairs may be fed through a computationally intensive function, such as the Password-based Key Derivation Function 2 (PBKDF2), before storage in a bloom filter to ensure that it is computationally expensive to try many OTP values in a brute force attack.

In accordance with an embodiment, the verification material can then be provided to a verification system which will use it to authenticate user access requests. In various embodiments, the verification system is not provided with the seed value that is embedded in the OTP devices and has no access to the seed value. When the verification system receives a request containing an OTP code from a user, the verification system can verify the correctness of the OTP code against the local data store containing the set of verification material (i.e. based on matching the received OTP code against one of the pre-generated OTP codes). Prior to expiration of the interval, the local store can be renewed with verification material for the next interval. This can be implemented by the verification system requesting the provider for the next set of verification material, or by the provider automatically updating the verification system with the next set of verification material. For example, prior to expiration of a predefined time period, the verification system can be provided with the verification material for the next time period. Similarly, in event-based systems, prior to exhausting the counter values, the verification system can be provided with the verification material for the next set of counter values.

In various embodiments, because the seed is never present on the verification system, it cannot be stolen from the verification system. In addition, OTP devices (e.g., security tokens) can be leased temporarily or resold because the permitted life of the code can be separated from the hardware life of the device. For example, tokens may be available in 1, 2, 3, 4, or 5 year life times with different prices. In this way, the provider can provide to a customer the verification material for the first year for a particular price, and might offer additional verification material for additional charge. The provider may also support returning unused tokens and resale/transfer of unused tokens for additional charge.

In various embodiments, the OTP security scheme described herein can be utilized in a multi-tenant shared resource environment (e.g., cloud computing environment) when performing authentication of various devices and/or services. Conventionally, in this type of environment, host computing devices utilize virtualization technology to provision one or more virtual machine instances that are associated with different customers of a service provider (e.g., cloud computing provider). These virtual machine instances are hosted on the computing device using a hypervisor (or other virtual machine manager) and each virtual machine instance is itself a guest operating system, including a kernel, device drivers and other OS components. The host computing devices and other physical resources to host the virtual machines are usually provided by the service provider and reside in resource centers, such as a data centers, server farms, content delivery network (CDNs) points-of-presence (POPs) and the like.

In such multi-tenant shared resource environments, it can be useful for the service provider to utilize a token based security approach with its customers in order to control access to the resources of the service provider. For example, the service provider may issue to each of its customers a number of tokens and a set of associated verification material for those tokens that will be valid for a predefined interval. In one embodiment, the service provider issues the verification material without providing the customer with the seed that was used to generate the verification material. Once the predefined time interval is close to expiration, the service provider may issue renewal verification material for the next interval. This process can continue as long as needed and the service provider may utilize this process to control access to its resources as previously mentioned.

FIG. 1 illustrates an example 100 of a set of pre-generated OTP codes being used by a verification system to authenticate user access requests, in accordance with various embodiments. In the illustrated embodiment, the provider 101 (e.g., security token manufacturer, vendor, etc.) generates a set of valid OTP codes 106 for a predefined interval (e.g., time interval, number of event-based counter values, etc.). For example, the provider 101 may use the seed for some number of time windows in the future (e.g. a week, a year) and calculate every value that the OTP code will take on over those time intervals. This creates a set of valid OTP codes. The pre-generated OTP codes can then be encoded, such as by hashing 108 each OTP code with a time identifier that indicates a time window during which the OTP code is valid. For example, if the OTP code will be valid for a 30 second time frame, the time identifier may be the time value of the first second during which the OTP code becomes valid. Alternatively, for event-based systems, the pre-generated OTP codes can be encoded by hashing the OTP code with the event-based counter value associated with the OTP code. In some embodiments, the OTP code can also be salted with a unique identifier of the OTP device or by some other random value. As well known in the art, a salt value includes a set of random bits that serves as one of the inputs to a one-way function (e.g., encoding function). It should be noted that encoding as described in the various embodiments, is not limited to hash functions or time values and can be encoded in various other ways suitable for storing and identifying the OTP codes. In one embodiment, the OTP codes are encoded using a Password-based Key Derivation Function 2 (PBKDF2). PBKDF2 is an example of a key stretching technique that can be used to make a possibly weak key (e.g., a password or passphrase) more secure against a brute force attack by increasing the time it takes to test each possible key. In various embodiments, other key stretching techniques can be utilized within the scope of this disclosure.

In the illustrated embodiment, once the OTP codes are encoded with their respective time values 107, the codes can be stored into a data structure 109 that is suitable for efficient storage of a large number of codes. For example, the encoded OTP codes can be stored into a bloom filter or other space-efficient probabilistic data structure that can be used to test whether an element is a member of a set. In various embodiments, encoding the OTP codes and storing them in such a manner can make it more difficult to use the pre-generated set to determine what the valid codes are (other than brute force trial of each value which can be made fairly slow). Thus, although it may still be undesirable to compromise the entire set of pre-generated OTP codes, if that set is stolen, it would only contain a limited amount of information. For example, if the provider sends out one day's codes and if those codes are compromised a month later, then there has been no exposure of security.

In accordance with an embodiment, once the OTP codes have been pre-generated, encoded and stored, they can be provided to a verification system 103 (e.g., over a network 102 connection). In various embodiments, the verification system can be any server, system or computing device that is capable of controlling access to resources by one or more users. For example, the verification system 103 can be a secure server maintained by a bank that authenticates user requests and provides access to the users' financial records. In various embodiments, the verification system 103 is not provided with the seed value that is used to generate the OTP codes and does not have any access to the seed value.

In the illustrated embodiment, the verification system 103 uses the verification material 110 (e.g., encoded and stored OTP codes) to authenticate requests from the various users. For example, a user 104 having an OTP code 111 that was generated by his/her device can use a client device (e.g., computer, smart phone, tablet, etc.) to submit a request to the verification system. The request can include the OTP code 111 generated by the user's token based on the seed value 112. Once the verification system receives the access request, it can authenticate the request based at least in part on the OTP code contained in the request. For example, the verification system can check whether the OTP code in the request matches any of the OTP codes in the verification material 110 that was obtained from the provider 101. In some embodiments, the verification system can hash the OTP code received as part of the request with a timestamp of the request when matching the OTP codes. In other embodiments, the hashing of the request can be performed on the client device or by some other component. As previously mentioned, a potential optimization is to make the hash calculation intentionally slow in order to make it difficult to check many numbers against the pre-generated list (brute force hacking).

Figure 2:
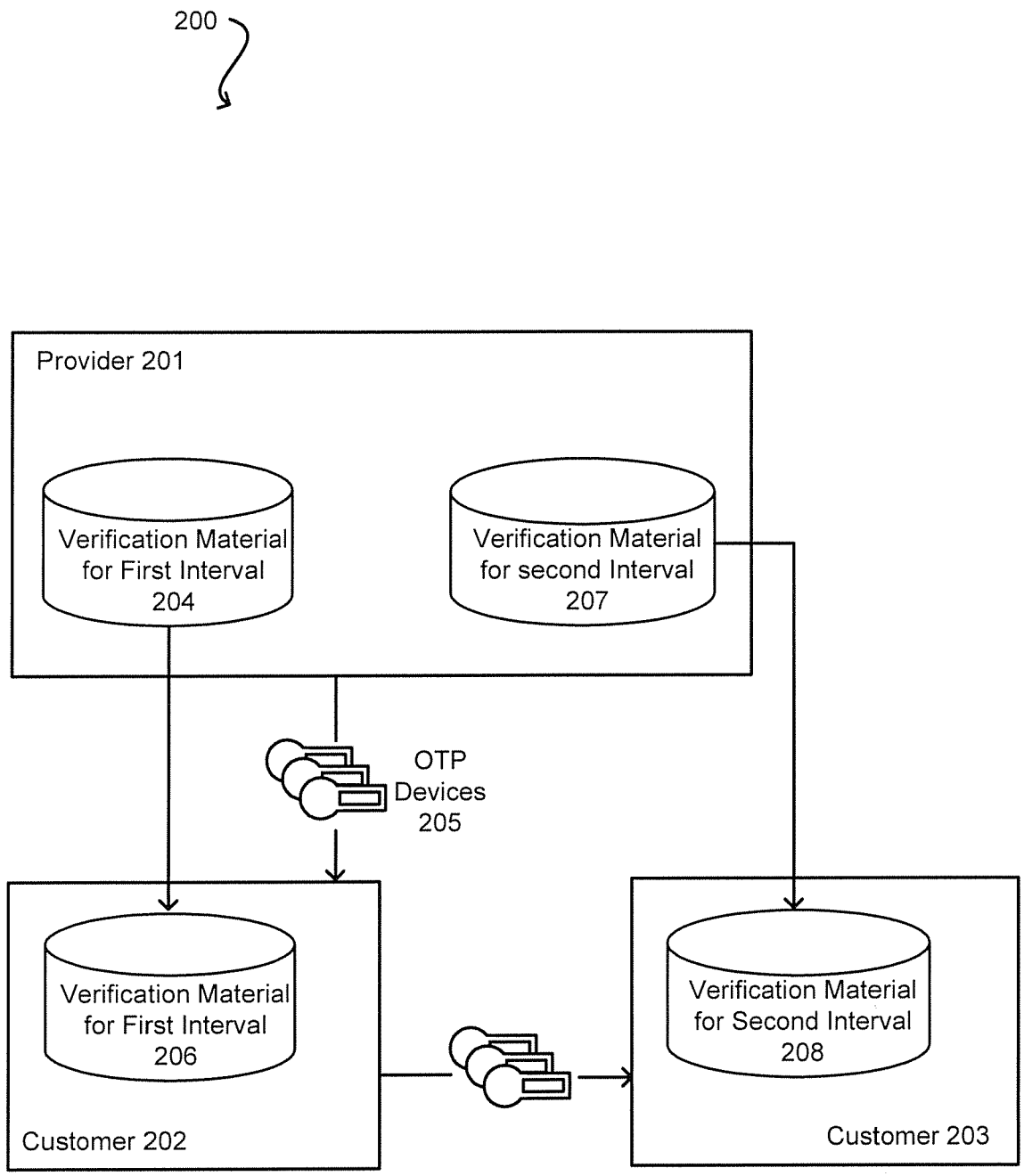
FIG. 2 illustrates an example of re-using existing OTP devices with other verification systems and/or other users, in accordance with various embodiments.

FIG. 2 illustrates an example 200 of re-using existing OTP devices with other verification systems and/or other users, in accordance with various embodiments. In the illustrated embodiment, the provider 201 may provide a set of OTP devices 205 (e.g., security tokens) to a first customer 202. In addition to providing the devices, the provider 201 can provide a set of verification material 204 (e.g., pre-generated OTP codes) for a first interval (e.g., one year, one thousand event-based counter values, etc.). In various embodiments, the customer 202 is not provided with the seed material used to generate the OTP codes. The customer 202 can distribute the OTP devices 205 to its users and use the pre-generated verification materials 206 stored locally on its verification systems to authenticate user requests during the first time interval.

In some cases, the customer 202 or the provider 201 may choose to terminate their relationship. As shown in the illustrated embodiment, the OTP devices 205 can then be transferred to another customer 203 of the provider 201. In various alternative embodiments, the devices may be returned to the provider 201, sold on the open market or otherwise transferred to other parties. Once the first interval expires, the second customer 203 can obtain a set of pre-generated verification material 207 from the provider 201 and begin using the OTP devices to authenticate user requests (e.g. by using the locally stored verification material 208 for the next interval).

In some embodiments, each device may include an input method to immediately advance the OTP device to the next interval, thereby enabling the OTP device to be used with the new verification material, without having to wait for the interval to expire naturally. For example, the user may hold the button on the OTP device pressed down for a number of seconds, causing the device to advance to the next interval. In that event, the old verification material could no longer be used with the device because the device was advanced to the new interval. In some embodiments, when the provider 201 receives a request for verification material from the customer 203 (e.g., a different verification system), the provider 201 can generate a new set of verification material 207 for the next interval in response to the request. Thereafter, when the verification system of customer 203 receives an access request from the user, the verification system of customer 203 can instruct the user to advance their device to the next interval (e.g., by holding down a button for a number of seconds), rather than allowing the interval to naturally expire on the device.

In this manner, if the vendor of the OTP devices (e.g., provider 201) only releases a limited amount of verification material at a time, the tokens are still valuable after being used. In contrast, for conventional OTP systems, used tokens are generally not desirable because it is difficult to ensure which parties have had access to the seed material. By being able to re-use the tokens in this manner, the vendor and/or other parties may choose to re-sell the token devices to other users. Similarly, this type of security scheme opens up other situations where a single token is passed among multiple verifiers at different points in time. For example, the manufacturer may have supplied one customer with verification material for two weeks. The next customer may purchase the token and obtain the verification material for the next two weeks. The second owner could then receive the token from the first owner; receive verification material for the next time frame (e.g., the next two weeks); and start using the used token starting on the day that the verification time frame begins. In various alternative embodiments, the manufacturer may sell the tokens with a year of verification material that has been partitioned into multiple partitions or the like. Yet other possible business models include third party service providers selling the OTP devices and/or verification materials on behalf of the manufacturer and the like.

Figure 3:
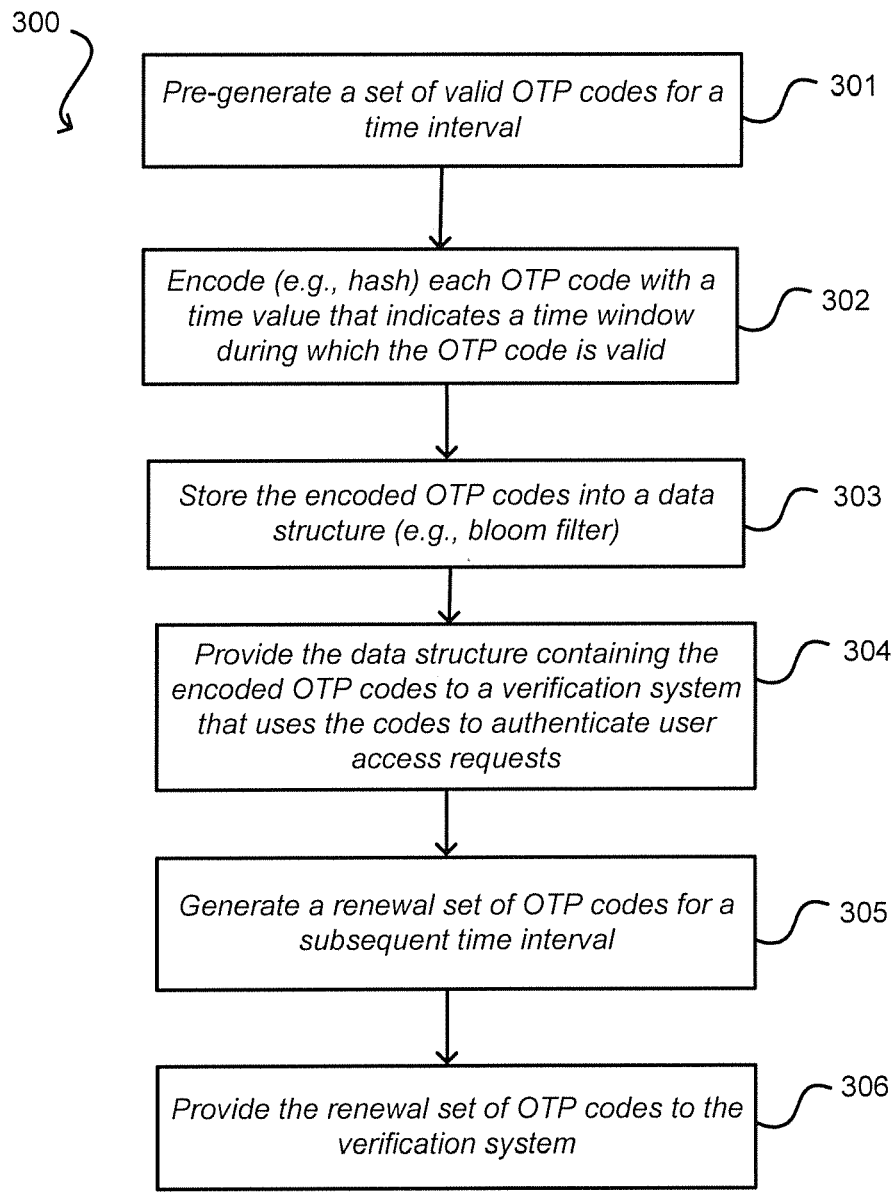
FIG. 3 illustrates an example process for pre-generating a set of OTP codes for a predetermined time interval and providing the OTP codes to a verification system, in accordance with various embodiments.

FIG. 3 illustrates an example process 300 for pre-generating a set of OTP codes for a predetermined time interval and providing the OTP codes to a verification system, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 301, the provider (e.g., vendor, manufacturer of OTP devices, etc.) can generate a set of one-time password (OTP) codes for a particular time interval. The OTP codes can be generated based at least in part on a seed value that is known to the provider. Each OTP code is capable of being used to verify a token device that can generate a matching OTP code based at least in part on a seed value embedded in the OTP device.

In operation 302, each of the OTP codes is encoded. In one embodiment, the OTP codes are hashed using a timestamp associated with the OTP code. For example, the timestamp may identify the time window during which the OTP code remains valid. In one embodiment, the OTP codes are hashed using PBKDF2, as previously described.

In operation 303, the encoded OTP codes are stored into a data structure. In one embodiment, the data structure is a bloom filter. In other embodiments, any other data structure can be used, that is suitable for efficiently storing the OTP codes.

In operation 304, the data structure containing the set of encoded OTP codes is provided to a verification system. The verification system can use the OTP codes to authenticate access requests from the users. For example, the verification system can receive a request containing a purported OTP code and attempt to authenticate the access request based at least in part on matching the purported OTP code contained in the access request to the OTP code of stored in the data structure.

In operation 305, the provider generates a renewal set of OTP codes for the next time interval. In one embodiment, the renewal codes can be generated prior to expiration of the first time interval. In other embodiments, the renewal set can be generated after the expiration of the first time interval; however, this may introduce an interruption in service.

In operation 306, the renewal set of OTP codes are provided to the verification system. In various embodiments, the renewal set of OTP codes can be encoded and stored in a manner similar to the first set of pre-generated OTP codes as described above.

Figure 4:
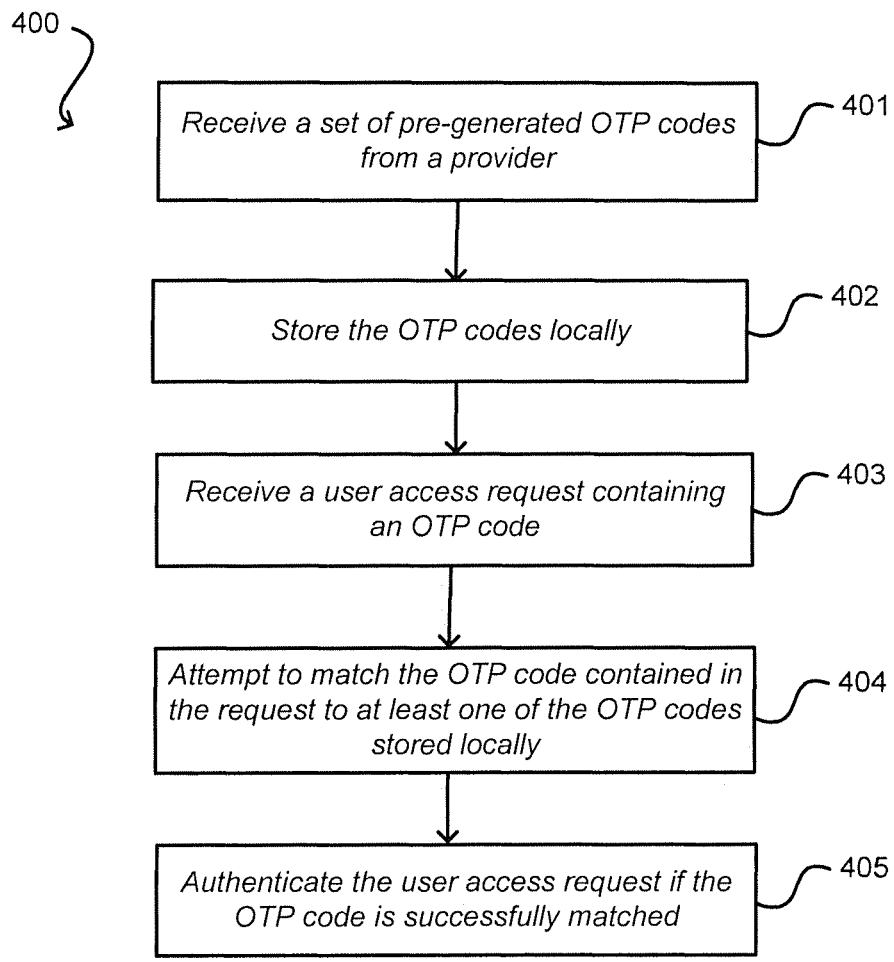
FIG. 4 illustrates an example process performed by a verification system to authenticate access requests, in accordance with various embodiments.

FIG. 4 illustrates an example process 400 performed by a verification system to authenticate access requests, in accordance with various embodiments. In operation 401, the verification system receives a set of pre-generated OTP codes from the provider. The OTP codes can be encoded and stored in an efficient data structure, as previously described. In operation 402, the verification system stores the set of pre-generated OTP codes locally (e.g., on the server performing the verification of requests).

In operation 403, the verification system receives an access request from a user. In one embodiment, the request contains an OTP code, along with other information relevant to the request. For example, the request may contain a timestamp that indicates a time at which the request was generated. In operation 404, the verification system attempts to match the OTP code contained in the request to an OTP code stored locally. When matching the OTP codes, the verification system can first encode the OTP code received with the request by hashing it with the timestamp contained in the request. It may then compare the hash value with the set of locally stored encoded values to determine whether the OTP code contained in the request matches any of the pre-generated OTP requests received from the provider. In operation 405, the verification system authenticates the access request if the OTP code contained in the request is determined to match an OTP code of the locally stored set. If the OTP codes are not matched, the verification system can deny the request or otherwise prevent access to various resources.

Figure 5:
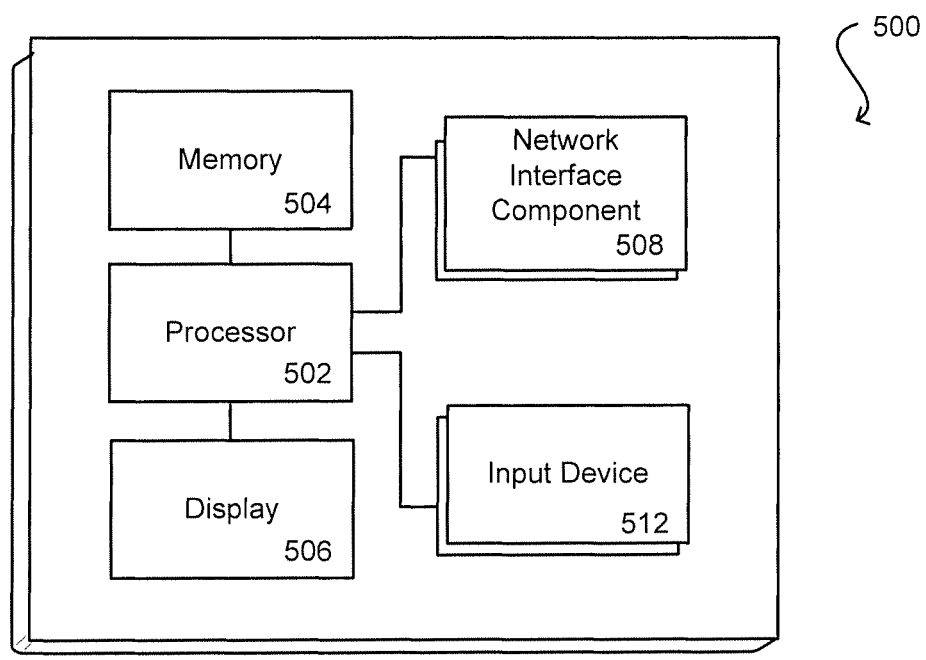
FIG. 5 illustrates a logical arrangement of a set of general components of an example computing device that can be utilized in accordance with various embodiments.

FIG. 5 illustrates a logical arrangement of a set of general components of an example computing device 500. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device typically will include some type of display element 506, such as a touch screen or liquid crystal display (LCD), although devices such as portable media players might convey information via other means, such as through audio speakers. As discussed, the device in many embodiments will include at least one input element 508 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 500 of FIG. 5 can include one or more network interface elements 508 for communicating over various networks, such as a Wi-Fi, Bluetooth, RF, wired, or wireless communication systems. The device in many embodiments can communicate with a network, such as the Internet, and may be able to communicate with other such devices.

Figure 6:
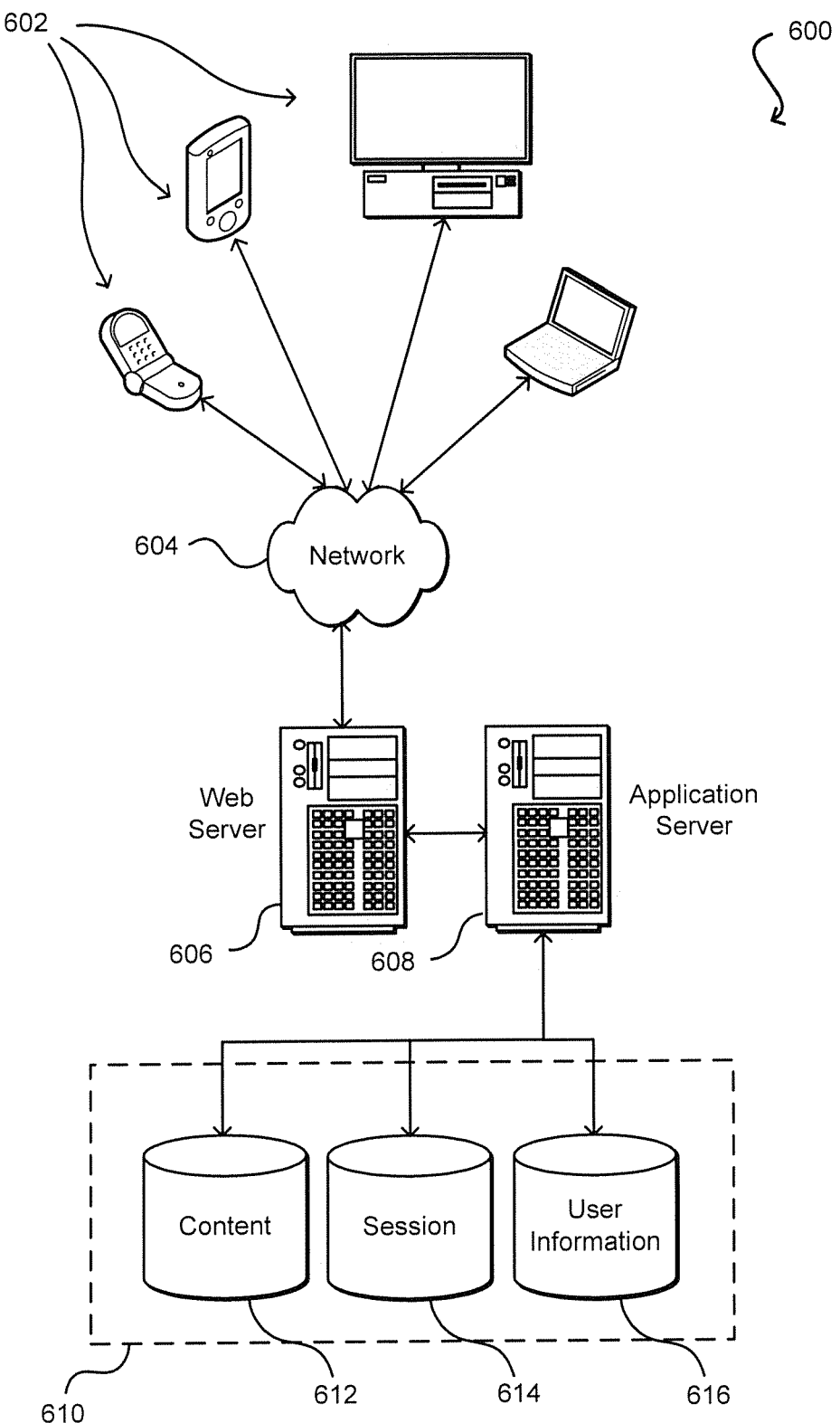
FIG. 6 illustrates an example of an environment for implementing aspects in accordance with various embodiments.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle °, Microsoft®, Sybase °, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for securing access in computing systems, the method comprising:
    generating, by a provider system, a plurality of one-time password (OTP) codes based at least in part on a seed value, wherein the seed value is accessible by the provider system and an OTP device and inaccessible to a verification system;
    encoding, by the provider system, individuals of the plurality of OTP codes based at least in part on an identifier that indicates a predetermined event duration during which the respective OTP code is valid;
    providing the seed value to the OTP device; and
    providing a data structure containing the plurality of encoded OTP codes to the verification system to authenticate one or more access requests to one or more cloud-based resources, the verification system to authenticate the one or more requests based, at least in part, on a comparison of the plurality of encoded OTP codes to a request OTP code associated with an access request of the one or more access requests.

2. The computer implemented method of claim 1, wherein the OTP device is configured to:
    generate the request OTP code based on the seed value; and
    provide the request OTP code to the verification system.

3. The computer implemented method of claim 2, wherein the verification system is configured to:
    decode the plurality of OTP codes;
    verify that the request OTP code matches one of the plurality of decoded OTP codes; and
    authenticate a request to access one or more resources in response to verifying the request OTP code.

4. The computer implemented method of claim 3, wherein the verification system is further configured to:
    identify a current time, wherein decoding the plurality of OTP is based on the current time.

5. The computer implemented method of claim 1, wherein the event duration is a time interval that the respective code is valid.

6. The computer implemented method of claim 1, wherein the encoding is a hash function.

7. The computer implemented method of claim 1, further comprising:
    generating, by the provider system, a second plurality of OTP codes based in part at least in part on the seed value;
    encoding, by the provider system, individuals of the second plurality of OTP codes based at least in part on a second identifier that indicates a second predetermined event duration during which the respective OTP code of the second plurality of OTP codes is valid; and
    providing a second data structure containing the second plurality of encoded OTP codes to the verification system.

8. The computer implemented method of claim 7, wherein the verification system is further configured to:
    decode the second set of OTP codes;
    send a notification to the OTP device to advance to the second event duration;
    receive a request OTP code from the OTP device;
    determine that one of the second plurality of decoded OTP codes matches the request OTP code; and
    authenticate the request to access one or more resources.

9. The computer implemented method of claim 1, further comprising:
    associating one of the plurality of OTP codes with a time identifier that indicates a portion of a predetermined interval during which the respective OTP code is valid;
    calculating a value of a cryptographic function based at least in part on the respective OTP code and the time identifier; and
    storing the value as an entry in the data structure.

10. A computer implemented method for verifying a one-time password (OTP), comprising:
    requesting a plurality of OTP codes and specifying an event duration;
    receiving a data structure containing a plurality of encoded OTP codes, wherein the OTP codes are generated utilizing a seed value that is inaccessible, and wherein the encoded OTP codes in the data structure are encoded based on the event duration;

decoding the data structure to identify a plurality of decoded OTP codes utilizing the event duration;

receiving a request OTP code and resource request from an OTP device;

verifying that the request OTP code matches one of the decoded OTP codes, wherein the seed value is inaccessible during verification; and authenticating the resource request based on verifying the request OTP.

11. The computer implemented method of claim 10, further comprising:

sending a notification to the OTP device that the event duration has expired;

requesting a second plurality of OTP codes and specifying a second event duration; and receiving a second data structure containing a second plurality of encoded OTP codes, wherein the second plurality of encoded OTP codes are generated utilizing the seed value, and wherein the second plurality of encoded OTP codes in the second data structure are encoded based on the second event duration.

12. The computer implemented method of claim 10, further comprising:

sending verification materials in response to authenticating the resource request.

13. The computer implemented method of claim 12, wherein the verification materials are valid for an interval.

14. The computer implemented method of claim 10, wherein the data structure is a bloom filter.

15. The computer implemented method of claim 10, wherein the seed value is embedded in the OTP device.

16. A provider computing system for verifying one-time passwords, comprising:

memory having instructions that when executed by the provider computing system enables the provider computing system to:

generate a plurality of one-time password (OTP) codes based at least in part on a seed value, wherein the seed value is accessible by the provider computing system and an OTP device and is inaccessible to a verification system;

encode individuals of the plurality of OTP codes based at least in part on an identifier that indicates a predetermined event duration during which the respective OTP code is valid; and provide a data structure containing the plurality of encoded OTP codes to the verification system to authenticate one or more access requests to one or more cloud-based resources, the verification system to authenticate the one or more requests based, at least in part, on a comparison of the plurality of encoded OTP codes to a request OTP code associated with an access request of the one or more access requests.

17. The provider computing system of claim 16, wherein the OTP device is configured to:

generate the request OTP code based on the seed value; and provide the request OTP code to the verification system.

18. The provider computing system of claim 16, wherein the verification system is configured to:

receive the data structure from the provider computing system;

receive the request OTP code with a request to access one or more resources from the OTP device;

decode the plurality of OTP codes;

verify that the request OTP code matches one of the plurality of decoded OTP codes; and authenticate the request in response to verifying the request OTP code.

19. The provider computing system of claim 16, wherein the data structure is a bloom filter.

20. The provider computing system of claim 16, wherein the memory having the instructions that when executed by the provider computing system further enables the provider computing system to:

provide the seed value to the OTP device.

* * * * *